May 12, 1953  C. R. RECHTIN  2,638,364
STUFFING BOX FOR DOUGH MIXERS
Filed Sept. 29, 1950  5 Sheets-Sheet 1

INVENTOR.
Clarence R. Rechtin.
BY
Wood, Arey, Herron & Evans.
ATTORNEYS.

May 12, 1953 C. R. RECHTIN 2,638,364
STUFFING BOX FOR DOUGH MIXERS
Filed Sept. 29, 1950 5 Sheets-Sheet 2

INVENTOR.
Clarence R. Rechtin
BY
Wood, Arey, Herron & Evans.
ATTORNEYS.

May 12, 1953 — C. R. RECHTIN — 2,638,364
STUFFING BOX FOR DOUGH MIXERS
Filed Sept. 29, 1950 — 5 Sheets-Sheet 3

INVENTOR.
Clarence R. Rechtin
BY Wood, Arey, Herron & Evans.
ATTORNEYS.

May 12, 1953 C. R. RECHTIN 2,638,364
STUFFING BOX FOR DOUGH MIXERS
Filed Sept. 29, 1950 5 Sheets-Sheet 4

INVENTOR.
Clarence R. Rechtin.
BY
Wood, Arey, Herron & Evans.
ATTORNEYS.

May 12, 1953  C. R. RECHTIN  2,638,364
STUFFING BOX FOR DOUGH MIXERS
Filed Sept. 29, 1950  5 Sheets-Sheet 5

INVENTOR.
Clarence R. Rechtin.
BY
Wood, Arey, Herron & Evans.
ATTORNEYS.

Patented May 12, 1953

2,638,364

UNITED STATES PATENT OFFICE 2,638,364

STUFFING BOX FOR DOUGH MIXERS

Clarence R. Rechtin, Cincinnati, Ohio, assignor to The J. H. Day Company, Inc., Cincinnati, Ohio, a corporation Application September 29, 1950, Serial No. 187,576

7 Claims. (Cl. 286—11.15)

This invention relates to stuffing boxes for dough mixers and is particularly directed to novel type of stuffing box which may be readily withdrawn from the mixer wall to permit the interior of mixer to be thoroughly cleaned.

A mixer of the type to which this invention relates includes a tank, which holds the dough being mixed, an agitator shaft passing through the two ends of the tank, and an agitator mounted upon the shaft. A common agitator construction comprises a pair of multi-armed spiders which are adapted to rotate with the shaft in the proximity of the end walls of the tank and bars or rods connecting corresponding arms of the two spiders. Stuffing boxes are provided in the bores of the two end walls of the tank through which the agitator shaft passes. The function of these stuffing boxes is to seal the tank against any leakage along the agitator shaft.

Heretofore, stuffing boxes were either made integral with the tank or were so constructed that they were required to be bolted into place which meant that they were very difficult to remove and the operation of removing and resecuring them in place was both laborious and time-consuming. Moreover, since the dough had a tendency to become trapped behind the spiders and around the stuffing boxes, the only way that the tank could be completely cleaned was to remove the stuffing boxes from the tank walls. Thus, if the tank was to be properly cleaned, the stuffing box had to be disengaged from the end wall and dismantled, and then after the tank had been cleaned, reassembled and reinserted into the bore provided in the tank wall. The result was that it was extremely difficult to effect a thorough cleaning of all of the surfaces of the tank, agitator, and agitator shaft which had been exposed to the dough. This was especially true of those areas of the tank walls behind the agitator spiders and adjacent to the stuffing box.

These cleaning difficulties represented a sizeable problem since the interior of dough mixers are frequently required to be thoroughly cleaned. Old dough cannot be permitted to accumulate in crevices or hidden pockets or trapped between the stuffing box and tank or behind the spiders. The problem has become even more pressing in view of the stringent sanitary codes which are now being enforced, and has made it highly desirable to provide a mixer construction which will permit the tank, agitator, and agitator shaft to be thoroughly cleaned with a minimum amount of trouble. Furthermore, even in the absence of sanitary regulations, it is desirable to facilitate the cleaning of the mixer with a view toward making it more probable that the operator will completely clean the equipment rather than perfunctorily clean the parts which are readily accessible while neglecting those which are difficult to reach.

The solution, which the present invention provides for this problem, is predicated upon the concept of providing a stuffing box which is held in the sealing position by simple rotatable locking means and which may be moved outwardly along the agitator shaft, away from the tank opening to a cleaning position so that the space between the agitator spiders and the end walls and the entire agitator shaft and stuffing box may be thoroughly cleaned.

Hence, one object of this invention is to provide a stuffing box which may be actuated bodily along the agitator shaft from a position in which the opening in the tank is sealed to a position in which the stuffing box is completely free of such opening, whereby the interior of the tank is readily accessible for cleaning.

Another object of this invention is to provide a stuffing box which may be moved by power means to and from its sealing position.

A further object of this invention is to provide a stuffing box which is held in the sealing position by simple mechanical means independent of the source of power used to move the stuffing box along the agitator shaft.

An additional object of this invention is to provide a stuffing box which will efficiently seal the tank and protect the agitator shaft and bearings from the corrosive effect of the materials being mixed in the tank.

Another object of this invention is to provide a stuffing box which may be shifted by power means along the agitator shaft back and forth from a sealing position to a cleaning position without the necessity of disassembling any part of the stuffing box assembly.

A further object of this invention is to provide a stuffing box which is so constructed that grease used to lubricate the stuffing box and agitator shaft cannot enter the mixing tank.

These and other objects and advantages of the invention will be apparent from a consideration of the specification taken in conjunction with the accompanying drawings in which.

Figure 1:
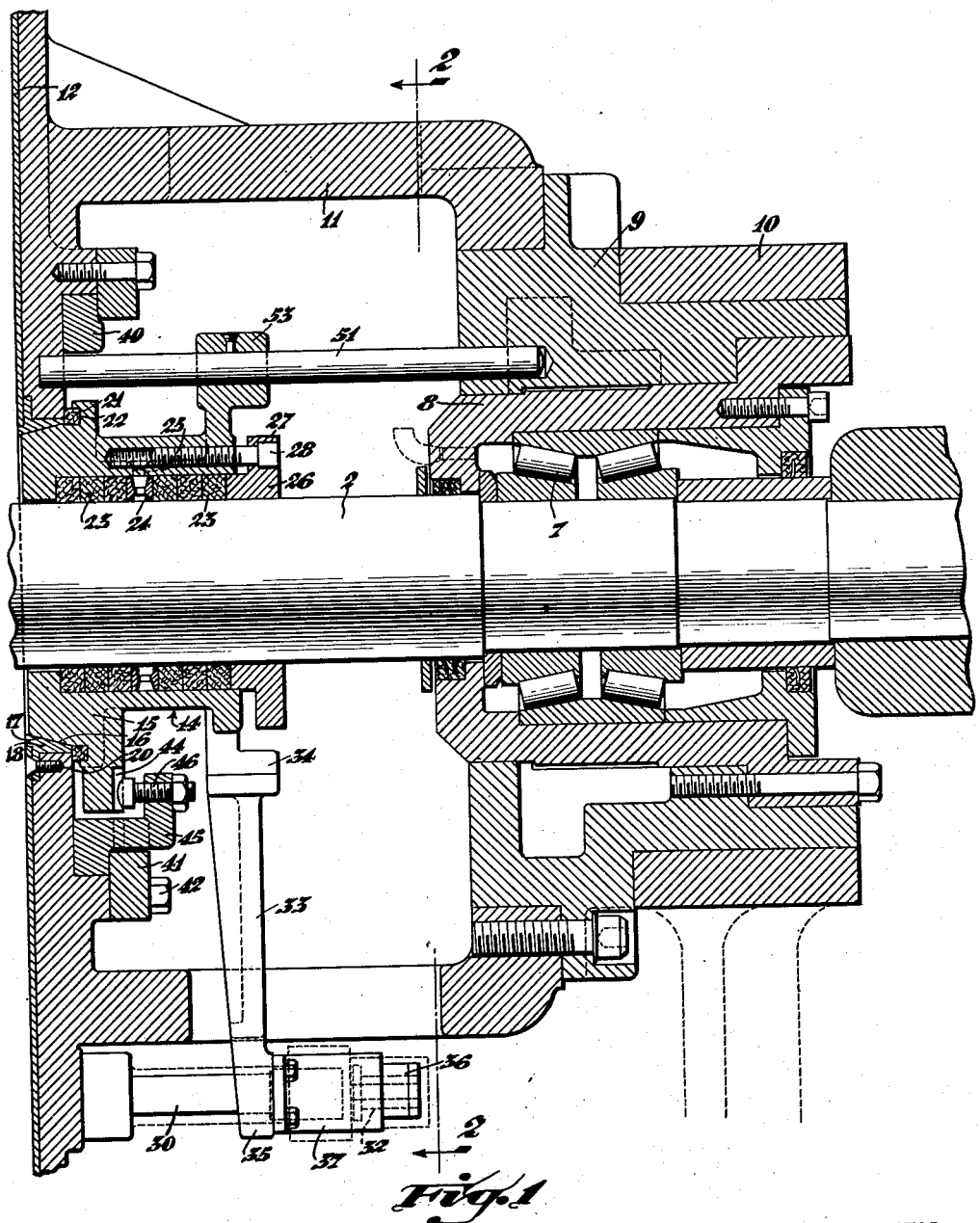
Figure 1 is a view in longitudinal vertical cross section of a dough mixer tank head, trunnion and bearing assembly at one end of a dough mixer provided with a stuffing box assembly arranged and constructed in accordance with the invention.

As shown in the drawings, the mixer comprises a tank having end walls 12 provided with openings through which the agitator shaft 2 extends. The agitator shaft 2 is mounted in trunnions 9 carried by the end frames 10 of the mixer. Multi-armed spiders 5 are secured to the agitator shaft 2 on the interior of the tank adjacent the end walls 12. Agitator rods 6 join the corresponding arms of the two spiders. The stuffing box assembly 14 is mounted upon the shaft 2 in such a manner that it may seat in the opening in the wall to provide a seal against leakage along the agitator shaft 2. The construction of the trunnions and bearing assemblies for the opposite ends of the shaft is substantially identical. Therefore, only one of these assemblies is illustrated in the drawings and described herein.

As shown in Figure 1, one end of the agitator shaft 2 is provided with an anti-friction bearing 7 disposed in a bearing housing 8 which is mounted in trunnion 9. The outer end of trunnion 9 is journalled in the end frame 10 of the mixer as shown. The inner end of trunnion 9 is secured to and supports tank head 11 to which the adjacent end wall 12 of the dough mixer is secured. As shown in Figure 1, the bearing housing 8 is bolted to trunnion 9 and the trunnion, in turn, is bolted to the tank head 11.

In order that the opening of the tank end wall 12 through which the agitator shaft 2 extends may be tightly sealed when the mixer is mixing dough to prevent leakage along the agitator shaft, a stuffing box assembly 14 is provided. The stuffing box assembly includes a power mechanism for actuating the stuffing box along the agitator shaft into or out of the stuffing or sealing position.

The stuffing box assembly 14 comprises a stuffing box 15 having a tapered inner end 16 disposed to seat on a tapered valve seat 17 formed in a ring-like valve member 18 secured to the end wall of the tank and the tank head by means of screws 20 as shown in Figure 1.

The stuffing box is also provided with an annular gasket 21 which is seated in groove 22 formed adjacent the outer end of the tapered portion of the stuffing box. This gasket seats tightly against the tank head 11 and valve ring 18 when the stuffing box 15 is in the closed position as shown in Figure 1. Thus, any leakage of dough around the outer periphery of the stuffing box, or that portion of it which engages the valve member, is prevented.

To prevent any leakage along the agitator shaft, the stuffing box may be packed, as shown, with a series of annular packing rings 23 that embrace the agitator shaft 2. To provide adequate lubrication of the stuffing box and the portion of the shaft within it, the packing rings 23 may be grouped and the groups separated by a ring-like grease cage 24. The grease cage 24 is of substantially H-shaped cross section and has a perforated web adapted to permit grease to reach the shaft. The grease may be supplied to the grease cage through an opening 25 in the stuffing box wall. By means of the grease cage 24 located as shown, grease is distributed uniformly throughout the length of the stuffing box. The packing rings of the stuffing box are retained under adjustable pressure by means of a cap ring 26 having a flange 27 by which it may be secured to the stuffing box, as with bolts 28. By adjusting bolts 28, the pressure exerted by the cap ring 26 on the packing may be adjusted as required to effectively seal the tank against leakage along the shaft and to seal the stuffing box against loss of grease. This adjustment ensures that there will be no passage of grease from the stuffing box into the mixing tank to contaminate the dough being mixed.

Figure 2:
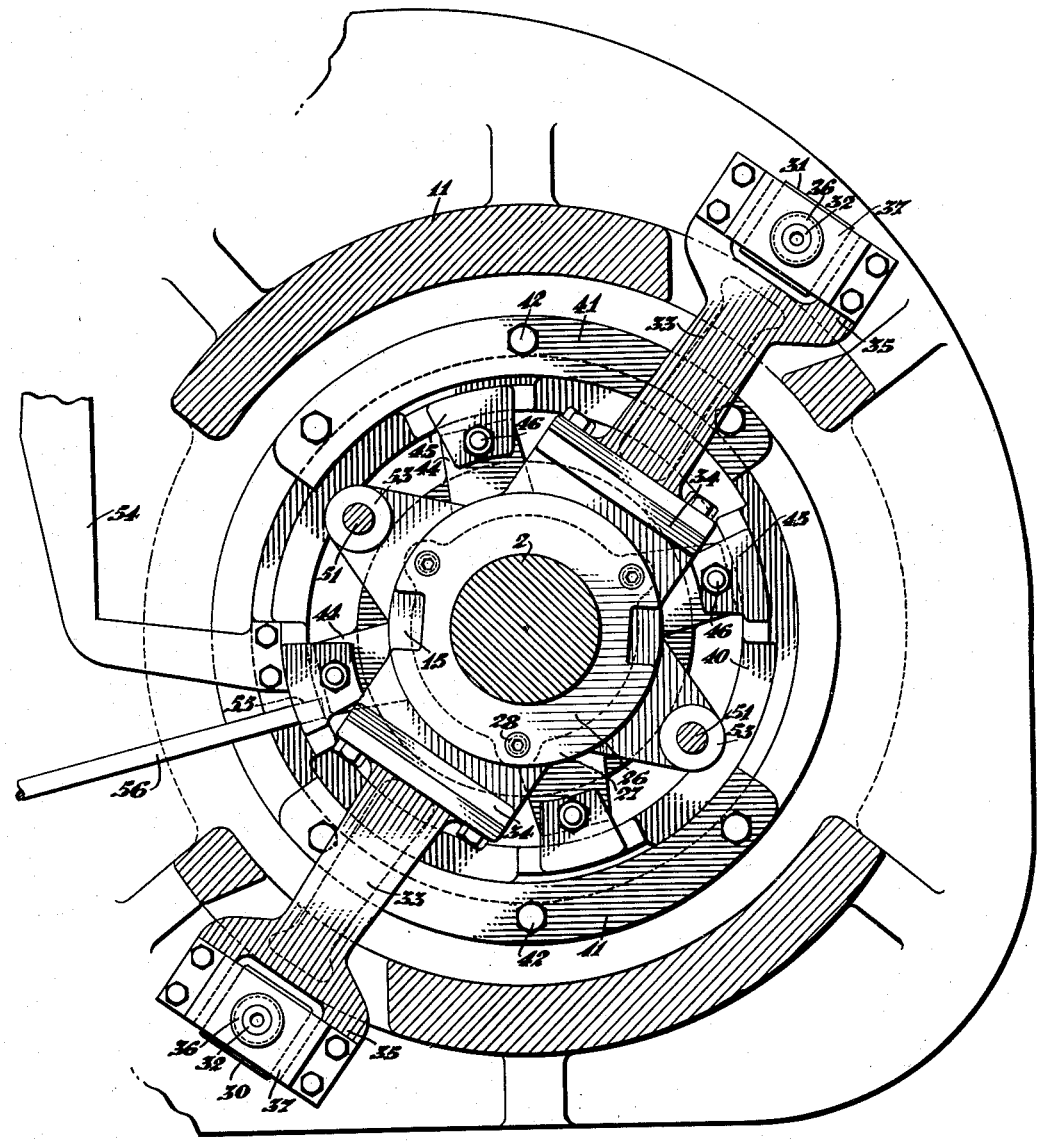
Figure 2 is a cross-sectional view taken along line 2—2 of Figure 1.

The stuffing box is provided with power means for moving it to or from the sealing position along the agitator shaft 2. The power means illustrated comprises a pair of hydraulic or pneumatic power cylinders 30 and 31 which are secured to the tank head. The piston rods 32 of these power cylinders are connected to radial arms 33 which are bolted to flanges 34 extending radially from the outer end of the stuffing box. As shown in Figure 2, the outer ends 35 of arms 33 are bifurcated to accommodate the power cylinder. As shown in Figure 1, the outer end of each piston rod 32 is provided with a sleeve 36 and each sleeve in turn, is secured to a bracket 37 that is bolted to the bifurcations 35 of arms 33. It will be understood that the actual piston arrangement and the hydraulic or pneumatic pressure system supplying the cylinders does not constitute a part of the present invention, it being necessary only that the pistons are of the double-acting type whereby the stuffing box will be actuated to or from the seat or valve ring 18 under positive power.

In order to secure the stuffing box in the seated or closed position without the necessity of maintaining pressure in the hydraulic or pneumatic system, means are provided for mechanically locking the stuffing box against the tank wall.

The locking means comprises a rotatable ring 40, which is held in place against the tank head 11 adjacent the inner end of the stuffing box 15 by means of clamp ring segments 41—41, which are secured to the tank head by bolts 42, and a plurality of cam or wedge segments 44 formed as an integral part of the stuffing box. Ring 40 is provided with a plurality of L-shaped flanges 45 in each of which a bolt 46 is threaded. As shown in Figure 1, bolt 46 has a rounded head disposed to engage the wedge or cam surface 44 of the stuffing box.

The construction of the bearing assembly, the trunnions, and stuffing box, illustrated and described, is such that the tank and the tank heads may be rotated relative to shaft 2. The tank is normally in the vertical position when being loaded or during the mixing period but is rotated into a horizontal position for dumping or cleaning. When the dough mixing tank is in position to mix dough, the stuffing box will be seated as shown in Figure 1 and will be held firmly in place by the engagement of the cams or wedges 44 with the heads of bolts 46.

Ring 40 is rotatable independently of the stuffing box and tank head so that the clamping pressure on the stuffing box, due to the engagement of the bolt heads with the wedges, may be removed at times when the stuffing box is to be moved away from the end wall of the dough mixing tank for cleaning purposes. In order to provide a simple means for rotating ring 40, a radial slot 55 is bored in the ring. This opening is adapted to receive the end of a rod 56 which can be inserted and then turned to rotate ring 40. When ring 40 is turned to a position where segments 44 are disengaged from bolts 46, the stuffing box may be actuated by the power cylinders outwardly towards the anti-friction bearing housing, whereby the opening into the tank is accessible for cleaning.

The stuffing box may be guided along shaft 2 by means of guide rods 51 which extend through openings in guide blocks 53 formed integrally with the outer end of the stuffing box.

When the stuffing box is to be returned to the seated position, it is actuated by the power cylinders along the agitator shaft into engagement with the valve member 13. It will be noted that the stuffing box is self-centering due to the interaction of the tapered valve seat 17 with the tapered inner portion of the stuffing box. After the stuffing box has been brought into engagement with the valve member, the hydraulic or pneumatic power is turned off and the ring 40 is rotated by means of the rod 56. As the ring rotates, the engagement of the bolt heads with the cam surfaces, wedges the stuffing box tightly against the valve member and compresses the annular gasket 21 to effectively seal the outer periphery of the stuffing box. After the ring 40 has been turned so that the bolts have urged the stuffing box into place tightly against the valve seat, the rod is removed and the stuffing box will remain firmly locked in the sealing position.

As shown in Figure 2, an indicator or flag element 54 is provided for indicating whether or not ring 40 is rotated so that the stuffing box is locked in the sealing position or whether ring 40 is disposed so that the bolts are free from engagement with the wedges so that the stuffing box may be actuated along the shaft by the power cylinders. As an additional safety feature, a pin secured to the end of the flag 54 automatically moves the power cylinder actuating valve into a neutral position which prevents any power from being applied to the cylinder, rendering it impossible to actuate the stuffing box outwardly along the shaft so long as ring 40 is positioned with its bolts engaging the wedges of the stuffing box locking it in place.

Figure 3:
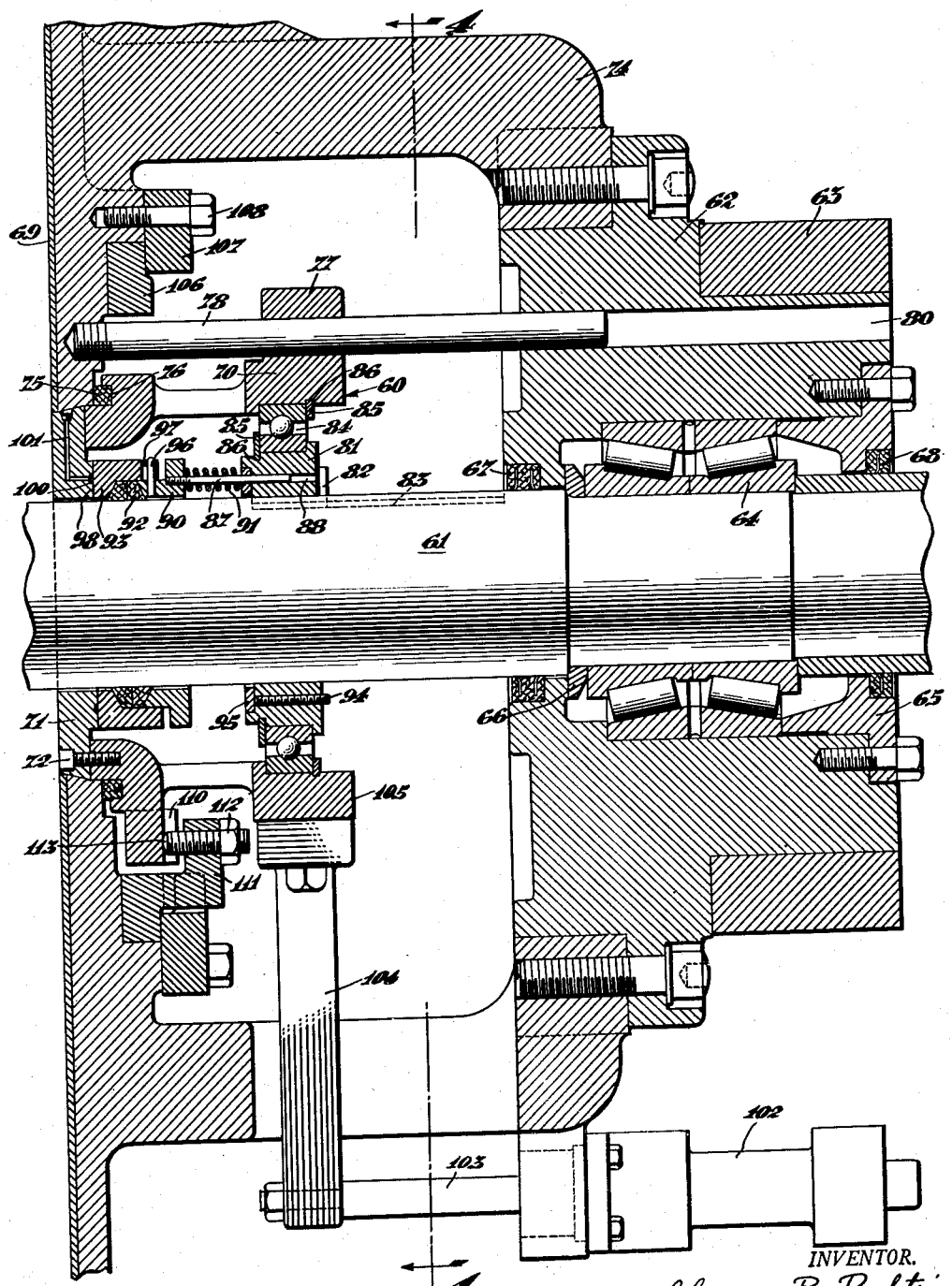
Figure 3 is a view similar to Figure 1 of a modification of the embodiment illustrated in Figure 1.
Figure 4:
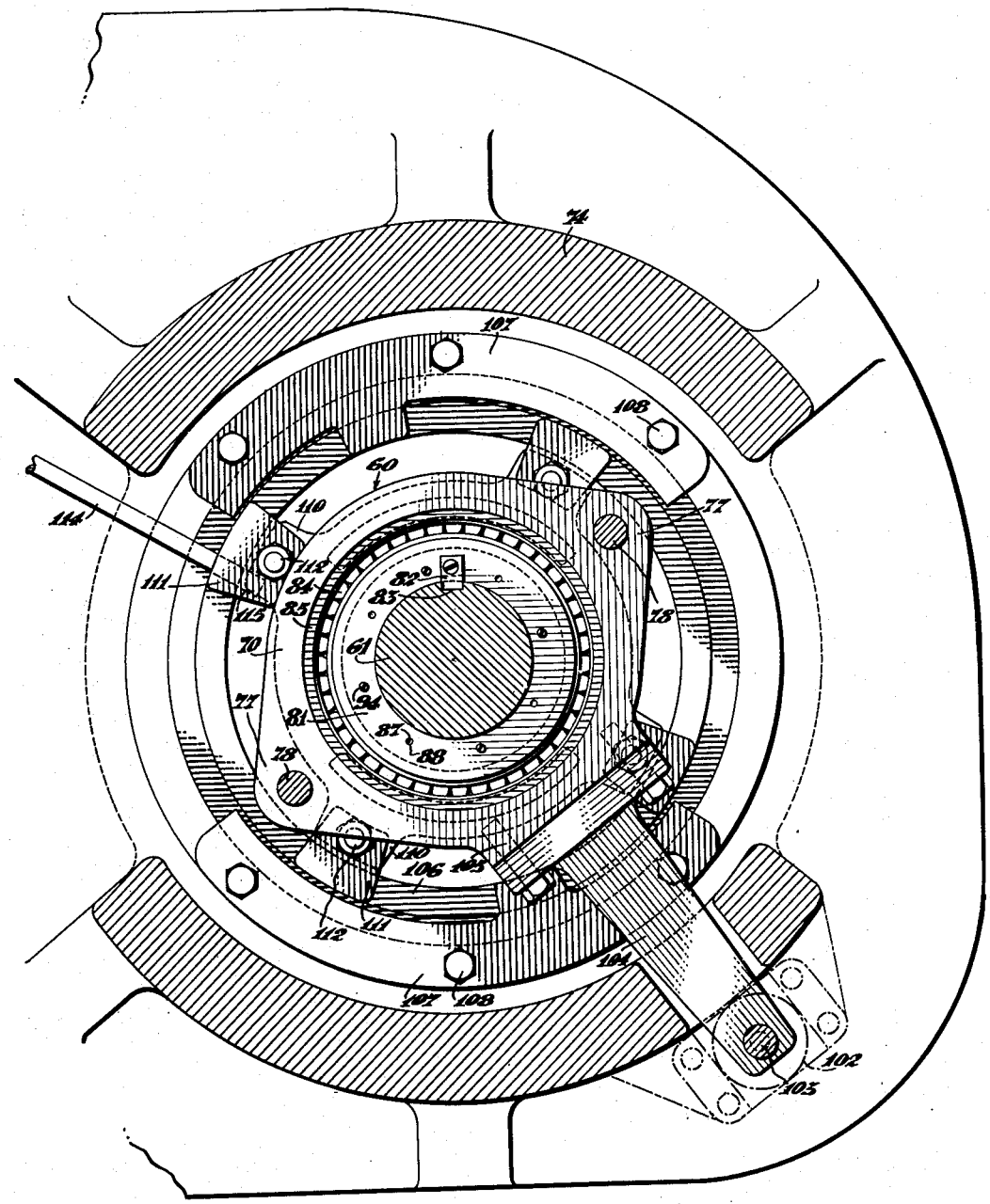
Figure 4 is a cross-sectional view taken along line 4—4 of Figure 3.
Figure 5:
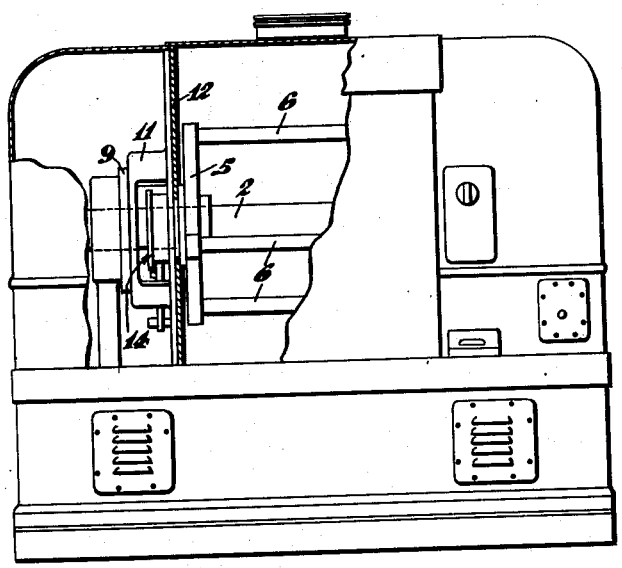
Figure 5 is a front elevation of a dough mixer, partially broken away, showing the relationship of the agitator shaft, tank walls, agitator spiders and stuffing boxes.

The modification shown in Figures 3 and 4 is generally similar to the embodiment shown in Figures 1 and 2, differing from it chiefly in that part of the stuffing box assembly 60 rotates with the agitator shaft 61 to form a rotary seal with the part of the stuffing box assembly which remains stationary.

The bearing and trunnion assembly of the modification also differs from the embodiment earlier described. As shown in Figure 3, the agitator shaft 61 is mounted in trunnion 62 carried by the end frame 63. The trunnion 62 is bolted to and supports the tank head 74 to which the adjacent end wall 69 of the dough mixer tank is secured. The shaft 61 is journalled in a roller bearing assembly 64 which is mounted directly in trunnion 62 and is held in place by a bearing collar 65 and a thrust ring 66. Packing rings 67 and 68 are provided to retain the grease within the bearing assembly.

The modified stuffing box assembly 60 comprises a stuffing box body 70 to which an inner sealing disc 71 is secured by means of bolts 72. The sealing disc fits flushly into the aperture in the tank wall 69 and head 74 through which the agitator shaft 61 is passed. A gasket 75, fitted into a groove 76 provided in the stuffing box body, is compressed between the stuffing box body 70 and the tank head 74 to prevent any leakage around the outer periphery of the sealing disc 71. Guide blocks 77 integral with the stuffing box body 70 slidably engage rods 78 which fit through bores 80 in the trunnion 62 and are threaded into the head 74. The engagement of the rods with the guide blocks serves to guide the stuffing box assembly 60 along shaft 61 when it is being withdrawn from engagement with the tank wall 69 and further serves to prevent rotation of the stuffing box body 70 and sealing disc 71 with the agitator shaft 61.

A rotary member 81 is keyed to the shaft 61 by means of an L-shaped key 82 seated in an elongated slot 83 in the agitator shaft 61. The rotary member 81 and stuffing box body 70 are held in axial alignment by means of a ball bearing assembly 84 positioned by retaining rings 85—85 fitted in grooves 86—86 in the rotating member 81 and stuffing box body 70.

Rods 87, fitted in bores 88 provided in the rotary member 81 and threadably engaging the cap ring 90, carry springs 91 for maintaining a pressure on the cap ring 90 which is holding gasket 92 against the sealing ring 93. The pressure on the gasket may be adjusted by tightening screws 94 which causes the adjusting ring 95 to further compress the spring 91.

It will be noted that the rods 87 cause the cap ring 90 to rotate with member 81 and, hence, with the agitator shaft 61. Furthermore, pins 96 secured to the cap ring and riding in slots 97 in the sealing ring 93 cause it to rotate with the shaft 61 also. An effective seal is thus provided between the bearing face 98 of the rotating sealing ring and the rear face of the stationary inner sealing disc 71. These contacting faces are lubricated by means of an annular oil groove 100 supplied with lubricant by conduit 101. As shown in Figures 3, tightening screw 94 tends to compress the gasket 92 and also serves to increase the pressure between the contacting faces of the inner disc 71 and sealing ring 93. The rotary contact of these faces under the pressure of the springs 91 thus prevents leakage between the stationary and rotary parts of the stuffing box assembly, while the gasket 92 prevents any leakage along the agitator shaft.

Movement of the stuffing box along the agitator shaft is effected by a power means which comprises a power cylinder 102 mounted upon the tank head 74. The piston rod 103 of this cylinder is connected to a radial arm 104 which is bolted to flange 105 extending radially from the outer end of the stuffing box body 70. Again, the actual arrangement of the piston and hydraulic or pneumatic pressure system is immaterial, the only requirement being that the piston be of the double-acting type whereby the stuffing box may be actuated to or from the position in which the sealing disc 71 is flush with the tank wall 69.

The means for locking the stuffing box in sealing position are similar to those employed in the embodiment illustrated in Figures 1 and 2. The locking means comprises a rotatable ring 106 which is held against the tank head 74 by means of clamp ring segments 107 which are secured to the tank head by bolts 108, and a plurality of wedge shaped segments 110 formed as an integral part of the stuffing box body. The rotating ring 106 is provided with a series of L-shaped flanges 111 in each of which a bolt 112 is threaded. As shown in Figure 3, the bolt has a rounded end 113 adapted to engage the wedge or cam surface 110 provided on the stuffing box body. As shown in Figure 4, the rotatable ring 106 may be turned by means of the rod 114 inserted in the opening 115 provided in the ring and the stuffing box then may be moved into or outwardly from the sealing position in the same manner as described for the first embodiment disclosed.

Having described the invention, it will be apparent to those skilled in the art that modifications and changes may be made in the illustrated embodiments thereof without departing from the spirit or scope of the invention.

Having described my invention, I claim:

1. In a stuffing box assembly for sealing the opening in an end wall of a dough mixer through which an agitator shaft extends, a sealing disc adapted to seat in said tank wall opening, a stuffing box body secured to said disc and slidably disposed on said shaft, means for preventing rotation of said stuffing box body and said disc, a rotatable member adapted to engage the rear face of said sealing disc to provide a seal therewith, means for causing said rotatable member to turn with said agitator shaft, and power means for moving said stuffing box assembly to or from the position in which the sealing disc is seated in said tank wall opening.

2. A stuffing box assembly for sealing the opening in an end wall of a dough mixer through which an agitator shaft extends, said stuffing box assembly comprising a stuffing box slidably disposed on said shaft exteriorally of and adjacent to said tank end wall, a seat provided about the periphery of said wall opening, the inner end of said stuffing box being adapted to be brought into sealing engagement with said seat, power means for moving said stuffing box along said shaft into and out of a position in engagement with said seat, means for locking said stuffing box in a seated position, said means including wedge segments secured to said stuffing box, a ring rotatably mounted upon said tank end wall, members rigidly mounted upon said ring for engaging said wedge segments, said members being effective to secure the stuffing box in the seated position when the ring is rotated in one direction, said members being disengaged from said wedge segments when said ring is rotated in a different direction thereby permitting said stuffing box to be moved along said shaft to a point remote from the end wall of the mixer to facilitate the cleaning thereof.

3. A stuffing box assembly for sealing the opening in an end wall of a dough mixer through which an agitator shaft extends, said stuffing box assembly comprising a stuffing box slidably disposed on said shaft exteriorally of and adjacent to said tank end wall, a seat provided about the periphery of said wall opening, the inner end of said stuffing box being adapted to be brought into sealing engagement with said seat, power means for moving said stuffing box along said shaft into and out of a position in engagement with said seat, means for locking said stuffing box in a seated position, said means including wedge segments secured to said stuffing box, a rotatable ring, clamping segments for mounting said rotatable ring upon said tank end wall, a plurality of flanges rigidly mounted upon said ring and extending inwardly therefrom, each of said flanges having a bolt associated therewith for engaging said wedge segments, the engagement of said wedge segments and said bolts being effective to secure the stuffing box in the seated position when the ring is rotated in one direction, said bolts being disengaged from said wedge segments when said ring is rotated in a different direction thereby permitting said stuffing box to be moved by said power means along said shaft to a point remote from the end wall of the mixer to facilitate the cleaning thereof.

4. A stuffing box assembly for sealing the opening in an end wall of a dough mixer through which an agitator shaft extends, said stuffing box assembly comprising a stuffing box slidably disposed on said shaft exteriorally of and adjacent to said tank end wall, a seat provided about the periphery of said wall opening, the inner end of said stuffing box being adapted to be brought into sealing engagement with said seat, power means for moving said stuffing box along said shaft into and out of a position in engagement with said seat, means for locking said stuffing box in a seated position, said means including wedge segments secured to said stuffing box, a ring rotatably mounted upon said tank end wall, members rigidly mounted upon said ring for engaging said wedge segments, said members being effective to secure the stuffing box in the seated position when the ring is rotated in one direction, said members being disengaged from said wedge segments when said ring is rotated in a different direction thereby permitting said stuffing box to be moved along said shaft to a point remote from the end wall of the mixer to facilitate the cleaning thereof, a visual indicator secured to said rotatable ring for indicating the position of the wedge engaging members, and means associated with said ring for rendering the power means ineffective to move said stuffing box when said wedge engaging members are in contact with said wedges.

5. A stuffing box assembly for sealing the opening in an end wall of a dough mixer tank through which an agitator shaft extends, said stuffing box assembly comprising a sealing disc encircling said shaft and adapted to seat in said tank wall opening in sealing engagement with the periphery of said opening, said sealing disc having a front face disposed toward the interior of said tank and a rear face remote therefrom, a stuffing box body secured to said disc, means for restraining said stuffing box body and said disc against rotation, a rotatable member for preventing leakage from said tank along said agitator shaft, said rotatable member being in sealing engagement with the rear face of said sealing disc, means for causing said rotatable member to turn with said agitator shaft, a gasket encircling said shaft and being compressed by said rotating member to prevent leakage from the tank along the shaft, a bearing in engagement with said rotatable member and said stuffing box body, said bearing being effective to prevent relative movement between said rotatable member and said stuffing box body in a direction along said shaft but permitting relative rotative movement between the two, and power means connected to said stuffing box body for moving said stuffing box and said rotatable member to and from a position in which said sealing disc is seated in said tank wall opening.

6. A stuffing box assembly for sealing the opening in an end wall of a dough mixer tank through which an agitator shaft extends, said stuffing box assembly comprising a sealing disc encircling said shaft and adapted to seat in said tank wall opening in sealing engagement with the periphery of said opening, said sealing disc having a front face disposed toward the interior of said tank and a rear face remote therefrom, a stuffing box body secured to said disc, means for restraining said stuffing box body and said disc against rotation, means for preventing leakage from said tank along said agitator shaft, said means including a rotatable member keyed to said shaft, a sealing ring in abutment with the rear face of said sealing disc, a gasket encircling said shaft in engagement with said sealing rings for preventing leakage from the tank along the shaft, a cap ring in engagement with said gasket, said cap ring being interconnetcted with said rotating member for rotation therewith, a spring interposed between said cap ring and said rotating member for urging said cap ring against said gasket, a pin interconnecting said cap ring and said sealing ring whereby the latter member rotates in unison with the cap ring, a bearing in engagement with said rotatable member and said stuffing box body, said bearing being effective to prevent relative movement between said rotatable member and said stuffing box body in a direction along said shaft but permitting relative rotative movement between the two, and power means connected to said stuffing box body for moving said stuffing box and said rotatable member to and from a position in which said sealing disc is seated in said tank wall opening.

7. A stuffing box assembly for sealing the opening in an end wall of a dough mixer tank through which an agitator shaft extends, said stuffing box assembly comprising a sealing disc encircling said shaft and adapted to seat in said tank wall opening in sealing engagement with the periphery of said opening, said sealing disc having a front face disposed toward the interior of said tank and a rear face remote therefrom, a stuffing box body secured to said disc, means for restraining said stuffing box body and said disc against rotation, a rotatable member for preventing leakage from said tank along said agitator shaft, said rotatable member including a sealing ring in abutment with the rear face of said sealing disc, means for causing said rotatable member to turn with said agitator shaft, a gasket encircling said shaft in contact with said sealing ring to prevent leakage from the tank along the shaft, a cap ring in engagement with said gasket and adapted for movement relative to said sealing ring whereby the pressure on said gasket may be varied, a bearing in engagement with said rotatable member and said stuffing box body, said bearing being effective to prevent relative movement between said rotatable member and said stuffing box body in a direction along said shaft but permitting relative rotative movement between the two, power means connected to said stuffing box body for moving said stuffing box and said rotatable member to and from a position in which said sealing disc is seated in said tank wall opening, and locking means for securing the stuffing box in the seated position, said means including wedge segments associated with said stuffing box body and a ring rotatably mounted on said tank end wall, said ring carrying fixed members for engaging said wedge segments.

CLARENCE R. RECHTIN.

References Cited in the file of this patent

UNITED STATES PATENTS

| Number | Name | Date |
|---|---|---|
| 206,139 | Ross | July 16, 1878 |
| 1,528,354 | Weaver | Mar. 3, 1925 |
| 1,869,933 | Cooke | Aug. 2, 1932 |
| 1,895,132 | Minor | Jan. 24, 1933 |
| 1,916,756 | Feldmeier et al. | July 4, 1933 |
| 1,965,698 | Goecke | July 10, 1934 |
| 1,723,934 | Heggem | Aug. 6, 1939 |
| 2,285,007 | Brennan et al. | June 2, 1942 |

FOREIGN PATENTS

| Number | Country | Date |
|---|---|---|
| 288,940 | Great Britain | of 1928 |
| 597,576 | Germany | of 1934 |